US012187905B2

(12) United States Patent
Zeira

(10) Patent No.: US 12,187,905 B2
(45) Date of Patent: Jan. 7, 2025

(54) ARTICLE OF MANUFACTURE, FORMULATION AND METHOD FOR PRINTING ON A FOAMED BEVERAGE

(71) Applicant: RIPPLES LTD., Petah Tikva (IL)

(72) Inventor: Assaf Zeira, Tel Aviv (IL)

(73) Assignee: RIPPLES LTD, Petah Tikva (IL)

( * ) Notice: Subject to any disclaimer, the term of this patent is extended or adjusted under 35 U.S.C. 154(b) by 641 days.

(21) Appl. No.: 17/285,617

(22) PCT Filed: Oct. 22, 2018

(86) PCT No.: PCT/IB2018/058224
§ 371 (c)(1),
(2) Date: Apr. 15, 2021

(87) PCT Pub. No.: WO2020/084328
PCT Pub. Date: Apr. 30, 2020

(65) Prior Publication Data
US 2021/0395547 A1 Dec. 23, 2021

(51) Int. Cl.
C09D 11/322 (2014.01)
A23L 5/43 (2016.01)
(Continued)

(52) U.S. Cl.
CPC .............. C09D 11/322 (2013.01); A23L 5/43 (2016.08); A23P 20/20 (2016.08); B41J 3/4073 (2013.01);
(Continued)

(58) Field of Classification Search
CPC ..... C09D 11/322; C09D 11/037; C09D 11/38; C09D 11/328; C09D 11/14; C09D 11/32;
(Continued)

(56) References Cited

U.S. PATENT DOCUMENTS 4,366,173 A * 12/1982 Parker ..................... C09B 61/00
426/28
4,496,605 A 1/1985 Targan
(Continued)

FOREIGN PATENT DOCUMENTS

CN 101072682 A 11/2007
CN 103957729 A 7/2014
(Continued)

OTHER PUBLICATIONS

JP2017110178A5 Machine Translation (by Google Translate)—published Jul. 122, 2019.
(Continued)

Primary Examiner — Drew E Becker
Assistant Examiner — Luis Eugenio Diou Berdecia
(74) Attorney, Agent, or Firm — Momentum IP; Marc Van Dyke

(57) ABSTRACT

Some embodiments of the invention relate to an article of manufacturing for printing on a foamed beverage comprising: an ink-jet cartridge; and a sugar-poor and unfermented-wort-based ink formulation disposed within the ink jet cartridge. The unfermented wort is the primary colorant of the ink formulation. In embodiments of the invention, (i) a ratio between the EBC number of the ink formulation and the 25° C. viscosity thereof is at least 400 (centipoise)$^{-1}$; (ii) the ink formulation is characterized by at least a EBC number of at least 1800 colorant units; (iii) the ink formulation comprises at least 10% wt/wt carbohydrates; (iv) the ink formulation is sugar-poor such that a ratio between a wt/wt % concentration of soluble sugars and a wt/wt concentration of carbohydrates in the ink formulation is at most 0.2 (e.g. ≤0.1 or ≤0.05); and (v) at least 60% of particles of the ink formulation are sub-400 nanometer particles.

19 Claims, 4 Drawing Sheets

Formulation based on
Blackprinz®/Briess grain
(dehusked)

(51) Int. Cl.
*A23P 20/20* (2016.01)
*B41J 3/407* (2006.01)
*C09B 61/00* (2006.01)
*C09D 11/037* (2014.01)
*C09D 11/38* (2014.01)
*C12C 11/11* (2019.01)
*A23P 20/25* (2016.01)

(52) U.S. Cl.
CPC ............ *C09B 61/00* (2013.01); *C09D 11/037* (2013.01); *C09D 11/38* (2013.01); *C12C 11/11* (2013.01); *A23P 2020/253* (2016.08); *A23V 2002/00* (2013.01)

(58) Field of Classification Search
CPC ... A23L 5/43; A23L 2/58; B41J 3/4073; B41J 2/17503; B41J 3/407; C09B 61/00; C09B 67/0083; C12C 11/11; C12C 1/18; C12C 12/00; A23P 2020/253; A23P 20/10; A23P 20/15; A23P 20/18; B41M 5/0047; B41M 5/0076; A47J 31/4496; B44C 1/00; A23G 3/0089
USPC ........................................................ 426/250
See application file for complete search history.

(56) References Cited

U.S. PATENT DOCUMENTS

| | | | |
|---|---|---|---|
| 7,884,953 B1 | 2/2011 | Willcocks et al. | |
| 2005/0003055 A1* | 1/2005 | Baydo | A23G 3/343 426/383 |
| 2009/0317519 A1 | 12/2009 | Lavie et al. | |
| 2012/0021116 A1* | 1/2012 | Itakura | C12C 5/026 426/598 |
| 2015/0147444 A1* | 5/2015 | Eliav | A23L 5/43 426/540 |
| 2015/0251470 A1 | 9/2015 | Lavie et al. | |
| 2016/0021907 A1* | 1/2016 | Cavin | A23G 3/0097 426/87 |
| 2017/0066252 A1 | 3/2017 | Eliav et al. | |
| 2021/0106164 A1 | 4/2021 | Lavie et al. | |

FOREIGN PATENT DOCUMENTS

| | | | | |
|---|---|---|---|---|
| CN | 105209560 A | 12/2015 | | |
| CN | 205381003 U | 7/2016 | | |
| CN | 107075287 A | 8/2017 | | |
| EP | 0372243 A1 * | 6/1990 | ............ | C12C 5/04 |
| IL | 178519 A | 4/2016 | | |
| JP | 2759215 B2 | 7/2016 | | |
| JP | 2016119894 A | 7/2016 | | |
| JP | 2016119895 A * | 7/2016 | | |
| JP | 2017110178 A | 6/2017 | | |
| KR | 20030093471 A | 12/2003 | | |
| KR | 100485145 B1 | 7/2016 | | |
| WO | 0194116 A2 | 12/2001 | | |
| WO | 2005069729 A2 | 8/2005 | | |
| WO | 2007013061 A2 | 2/2007 | | |
| WO | WO-2007141557 A1 * | 12/2007 | ............ | C09D 11/30 |
| WO | 2008047347 A2 | 4/2008 | | |
| WO | WO-2014001153 A1 * | 1/2014 | ............ | A23G 1/305 |
| WO | 2014139966 A1 | 9/2014 | | |
| WO | 2017221077 A2 | 12/2017 | | |

OTHER PUBLICATIONS

KR20030093471A Machine Translation (by Google Translate)—published Apr. 25, 2005.
Weyermann: "Original Superb Bavarian and Bohemian Two-Row Malts", Weyermann Malt, Sep. 30, 2017 (Sep. 30, 2017).
International Search Report for PCT/IB2018/058224 mailed on Mar. 24, 2019.
Written Opinion for PCT/IB2018/058224 mailed on Mar. 24, 2019.
Product Specification of Weyermann® Roasted Malt Extract (RME) [Sep. 29, 2018], retrieved from Weyermann website on Nov. 15, 2021.
Machine Translation (by Google Patents) for CN101072682 published on Nov. 14, 2007.
Machine Translation (by Google Patents) for CN103957729 published on Jul. 30, 2014.
Machine Translation (by Google Patents) for CN105209560 published on Dec. 30, 2015.
Machine Translation (by Google Patents) for CN107075287 published on Aug. 18, 2017.
Machine Translation (by Google Patents) for CN205381003 published on Jul. 13, 2016.
Machine Translation (by EPO and Google) for EP0372243 published on Jun. 13, 1990.
Machine Translation (by Google Patents) for JP2016119894 published on Jul. 7, 2016.
Machine Translation (by Google Patents) for JP2016119895 published on Jul. 7, 2016.
Machine Translation (by Google Patents) for JP2759215 published on Jul. 7, 2016.
Machine Translation (by Google Patents) for KR100485145 published on Jul. 7, 2016.
Machine Translation (by EPO and Google) for IL 178519 published on Apr. 21, 2016.
Co-pending U.S. Appl. No. 17/079,477, filed Oct. 25, 2020.
Co-pending U.S. Appl. No. 17/039,824, filed Sep. 30, 2020.
Co-pending U.S. Appl. No. 17/039,828, filed Sep. 30, 2020.
Co-pending U.S. Appl. No. 16/311,881, filed Dec. 20, 2018.

* cited by examiner

Draw Down Results

Formulation based on
Blackprinz®/Briess grain
Brix 15.5; EBC 2407;
Viscosity 3.7 cP Unmodified
Guinness® draught Beer
Brix 5; EBC 110;
Viscosity 1.5 cP

Draw Down Results

Formulation based on
Blackprinz®/Briess grain
Brix 15.5; EBC 2407;
Viscosity 3.7 cP Concentrated/evaporated
Guinness® Beer
Brix 25; EBC 1365
Viscosity 15 cP Formulation based on
Blackprinz®/Briess grain
(dehusked)

Formulation based on
Weyermann® CARAFA® Type 3
grain (not dehusked)

ARTICLE OF MANUFACTURE, FORMULATION AND METHOD FOR PRINTING ON A FOAMED BEVERAGE

FIELD OF THE INVENTION

The present disclosure relates to articles of manufacture, formulations, and methods for printing on a foamed beverage such as a beer.

BACKGROUND

Beer has been known to mankind for millennia, and was recorded in the written history of ancient Egypt and Mesopotamia and spread throughout the world. The four most important ingredients of beer are cereal grain (e.g. wheat or barley), water, hops and yeast.

Worts and Manufacturing Thereof

During fermentation, a 'wort' is mixed with yeast in a fermentation vessel. The yeast converts sugars of the wort (i.e. sugars derived from the grain) into ethyl alcohol and carbon dioxide gas, giving the beer both its alcohol content and its carbonation.

To manufacture the wort, a grain (typically pre-malted and pre-roasted) is soaked in water in a process known as mashing. Mashing is defined in the literature (see 'How to Brew' by John Palmer) as the:

brewer's term for the hot water steeping process which hydrates the barley, activates the malt enzymes, and converts the grain starches into fermentable sugars.

Because fermentation requires sugar, the wort produced by malting is necessarily rich in soluble sugar. Typically, a significant fraction or often a majority of this soluble sugar is maltose.

Salient features of worts used for producing beer are that they are (i) rich in soluble sugar; and (ii) contain a significant concentration of soluble amino acid compounds—i.e. soluble amino acids and/or soluble polypeptides and/or soluble proteins (e.g. having enzymatic activity).

Wikipedia also discusses the manufacture of worts from cereal grain, stating:

brewers use a process called mashing to extract the sugars. Brewers warm cracked malt in temperature-modulated water, activating the enzymes, which cleave more of the malt's remaining starch into various sugars, the largest percentage of which is maltose.

Malting

As noted above, when producing beer, the cereal grain is typically pre-malted and/or pre-roasted. Even though it is possible to produce beer without malting the grain and without roasting the grain, in most commercial application the cereal grain used to produce beer is, in fact, malted grain.

Malting is defined in the literature (see Sustainable Protein Sources 2017, Pages 79-104) as:

the limited controlled germination of grains in moist air, which results in the mobilization of amylases, proteases, and other enzymes which hydrolyze and modify the grain components and its structure.

By mobilizing amylase, the subsequently-manufactured wort (i.e. manufactured specifically from malted grain) has a higher concentration of sugars, in particular maltose. This is important in ensuring that a sufficient quantity of soluble sugar is available in the sweet wort for fermentation (in particular, fermentation which converts a substantial fraction of soluble sugars sourced from the cereal grain into ethanol) to proceed.

Another reference which discusses malting is the African Journal of Biotechnology (9(53):9018-9025•January 2011, which in the article entitled "Effects of malting conditions on the amino acid compositions of final malt states (emphasis added):

Barley has been widely used for the production of malt in the brewing industry. Malt was the main raw material indispensable for beer brewing. The fermentability of malt wort is dependent on an adequate supply of the essential nutrients required by yeast. The amino acid content is an important malt parameter to the yeast growth and metabolism in malt wort. To increase brewing fermentability and efficiency, malts with high levels of free amino nitrogen and amino acids are essential.

Barley Malt Syrup

Barley malt syrup is defined by Wikipedia as:

an unrefined sweetener processed by extraction from sprouted, i.e., malted, barley, containing approximately 65 percent maltose, 30 percent complex carbohydrate, 3% protein. Malt syrup is dark brown, thick and sticky, and possesses a strong distinctive flavor described as "malty". It is about half as sweet as refined white sugar. Barley malt syrup is sometimes used in combination with other natural sweeteners to lend a malt flavor.

One typical malt syrup is CBW special dark Malt manufactured by Briess®—this syrup is extremely dark, being characterized by an European Brewing Convention (EBC) number (discussed below) exceeding 3000, while an EBC number of even the darkest beers is no more than about 150 and usually much less. CBW special dark Malt syrup is also extremely sweet—according to the specification sheet published by the manufacturer, 13% wt/wt of carbohydrates of CW special dark Malt syrup are glucose and 47% wt/wt of the carbohydrates of CW special dark Malt syrup are maltose.

Malt Extract

Malt extract is also discussed by Wikipedia which defines the substance as "a sweet, treacly substance used as a dietary supplement."

Dietitian Sian Porter, spokeswoman for the British Dietetic Association, adds: "Malt extract contains some protein, calories, vitamins and minerals and easily digested, simple sugars."

Degrees Lovibond and European Beer Convention (EBC) Units

Brewwiki describes degrees Lovibond as follows (emphasis added):

Lovibond also known as degrees lovibond or abbreviated as L is a scale for measuring color originally introduced by Joseph Lovibond in the 1860's. To determine color the sample is placed in a "Tintometer" which also contains several numbered discs of tinted glass. The Lovibond color is the value assigned to the disc whose color most closely matches the sample. The original Lovibond scale was used to measure gas colors, but has since expanded to measure the colors of oils, chemicals, foods and beverages. For brewing, Lovibond is used primarily to specify grain colors—for example a dark roast malt might be 400 L, while a pale malt might only 2 or 3 L. In this application it is actually the color of a laboratory wort prepared from a sample of the malt under specified conditions whose color is determined. In older books, beer color may also be measured in Lovibond.

The Lovibond system is a numbering system that ranks different malts (i.e. either the dry source malted and roasted grain or a liquid derived therefrom) in order of light to dark.

When brewing beer, the greater the degrees Lovibond of the grain used to brew the beer, the darker the beer. Thus, light brews such as pale lager, blonde ale and English Bitters are manufactured from grains of at most about 10 degrees Lovibond. In contrast, darker brews such as brown ale, porter, and imperial stout are manufactured from grains of 20-80 degrees Lovibond.

Because the present disclosure relates to beers and worts, optical density is typically expressed in the present document in terms of European Brewing Convention (EBC) units, which is used interchangeably with 'EBC' or 'EBC number.'

SUMMARY

As noted above, unfermented malt-derived liquids such as wort, malt syrup and malt extract are generally rich in soluble sugars (in particular maltose) and preferably rich in soluble amino acid compounds. For the present disclosure, the term 'soluble amino acid compounds' refers to any combination of soluble amino acids, soluble polypeptides and soluble proteins.

Embodiments of the invention relate to a method of ink jetting an image on the surface of a foamed beverage (e.g. beer) using an unfermented-wort based ink formulation which is (i) both 'rich' in carbohydrates and 'poor' in soluble sugars (in particular maltose) and/or (ii) both 'rich' in carbohydrates and 'poor' in soluble amino acid compounds. In the present disclosure, the term 'poor' is a relative term' describing a concentration of soluble sugars or amino acid compounds relative to the total concentration of carbohydrates.

The unfermented-wort based ink formulation according to embodiments of the invention has an extremely high EBC number, has a 25° C. viscosity of at most 4.5 centipoise, substantially lacks large particles while being relatively rich in sub-150 nanometer particles.

In some embodiments, the presently disclosed ink formulation may be manufactured as follows:
A—roasted and malted grain (e.g. barley or wheat) of at least 300 degrees Lovibond is soaked in water to produce a wort which is rich in carbohydrates but having a relatively low concentration of soluble sugars;
B—both a humectant (e.g. about 10% glycerol) and a pH control agent (e.g. citric acid and/or lemon concentrate) are added. Although the addition of these ingredients reduces the optical density, they are required to improve the ability of the ink formulation to retain moisture and to maintain a pH level of the formulation in the 2.5-4.0 range; and
C—the ink subjected to a separations process (e.g. filtering) to so that the final ink formulation is relatively rich in sub-400 nanometer particles while substantially lacking larger particles. For example, at least 60% or at least 70% or at least 80% of all sub-micron particles within the formulation are sub-400 nanometer particles. For example, at least 60% or at least 70% or at least 80% of all sub-micron particles within the formulation are sub-300 nanometer particles. For example, at least 60% or at least 70% or at least 80% of all sub-micron particles within the formulation are sub-200 nanometer particles.

In embodiments of the invention, the separations process of step (C) places a limitation on the unfermented wort produced in step (A). In embodiments of the invention, not only must sufficient colorant present in the wort to produce an EBC exceeding 1600 (e.g. at least 1800) in the final ink formulation at the desired viscosity level, but this colorant must be in the form of sub-400 nm (or sub-300 nm or sub-200 nm) nano-pigments and/or dye. This is because larger pigment particles are pre-filtered from the ink formulation.

The presently-disclosed ink formulation is useful in a particular use-case where (i) an image is formed on foam (e.g. beer foam) using 'single pass' ink-jet techniques where only a single droplet per pixel is deposited from a nozzle of a thermal ink-jet cartridge; and (ii) this ink droplet is extremely small—e.g. having a weight of at most 65 nanograms. For this particular situation, in order to print an image that meets standards expected in the marketplace, the ink formulation surprisingly should be at least 1800 EBC units, and preferably higher. This stringent requirement exists despite the fact that a beer of 150 EBC units is considered extremely dark.

The low level of soluble amino acid compounds, provided by embodiments of the invention, is now discussed in brief. As noted above, the grain (e.g. roasted and/or malted) has a Lovibond value exceeding 300 degrees. Not wishing to be bound by theory, in order to achieve such a high Lovibond value, the grain (e.g. malted) is thus roasted so that almost all amino acid compounds of the grain react with carbohydrates to form Malliard particles, reducing the concentration of soluble amino acid compounds to very low levels not typically observed in conventional malt syrups. This is because almost all amino acid compounds are 'converted' into Malliard particles—in contrast, soluble amino acids are thus substantially absent (or present at low levels) in the unfermented wort, and in the resulting ink formulation).

The low level of maltose and of soluble sugars, provided by embodiments of the invention, is now discussed in brief. As noted above, the grain (e.g. roasted and/or malted) has a Lovibond value exceeding 300 degrees. Not wishing to be bound by theory, in order to achieve such a high Lovibond value, the grain (e.g. malted) is thus roasted so that almost all carbohydrates of the grain react with amino acid to form Malliard particles and/or with other carbohydrates of the grain to form caramel, reducing the concentration of soluble sugars to very low levels not typically observed in conventional malt syrups. This is because almost all carbohydrates are 'converted' into Malliard particles and/or caramel—in contrast, soluble sugars (in particular maltose) is thus substantially absent (or present at low levels) in the unfermented wort, and in the resulting ink formulation).

As stated above, because the present disclosure relates to beers and worts, optical density is typically expressed in the present document in terms of European Brewing Convention (EBC) units, which is used interchangeably with 'EBC' or 'EBC number.'

One Particular Example of the Ink Formulation

In one particular and non-limiting example, the ink formulation has the following properties—(i) an EBC of about 2400; (ii) a 25° C. viscosity thereof of less than 5.5 centipoise (e.g. between 3 and 3.5 centipoise); (iii) a percent solids of about 15-25% wt/wt; (iv) comprising about 10% glycerol; (v) a pH of about 3.5 (e.g. due to a presence of citric acid); (vi) a nutritional profile where the ink formulation comprises about 10-20% wt/wt carbohydrates but less than 1.5% wt/wt sugars and less than 1% wt/wt amino acid compounds; and (vii) a particle size distribution such that at least 60% or at least 70% or at least 80% of all sub-micron particles within the formulation are sub-X nanometer particles (X is a positive number X≤400).

More details are provided below.

EBC:Viscosity Ratio

In the present example, a new parameter labelled as the EBC:Viscosity ratio is defined and discussed. The EBC:viscosity ratio of a wort or ink formulation comprising a wort is a ratio between: (i) the EBC number of the wort of the ink formulation and a 25° C. viscosity thereof. The units of EBC:viscosity ratio are (centipoise)$^{-1}$, used interchangeably with (cp)$^{-1}$ or cp$^{-1}$ In the present document, whenever a EBC:viscosity ratio is mentioned without explicit units, it is understood that the units are(centipoise)$^{-1}$.

In the particular example of the preceding subsection, the EBC:Viscosity ratio is between about 2400/4 (centipoise)$^{-1}$ and 2400/3.5 (centipoise)$^{-1}$—i.e. between about 600 about 700 (centipoise)$^{-1}$. This is not a limitation.

In different embodiments, the EBC:Viscosity ratio of the ink formulation least 400 (centipoise)$^{-1}$ or at least 450 (centipoise)$^{-1}$ or at least 500 (centipoise)$^{-1}$ or at least 550 (centipoise)$^{-1}$ or at least 600 (centipoise)$^{-1}$ The present inventor has examined the following alternatives to the presently-disclosed ink formulation, and shows that for each alternative the EBC:viscosity is significantly lower:

Alternative A—commercially available Guinness® Draught Beer (i.e. not filtered after purchase)—Guinness® has an EBC number of about 110 and a 25° C. viscosity of about 1.5 centipoise, yielding a EBC:viscosity ratio of about 75 (centipoise)$^{-1}$. It is believed that due to the fermentation process required for beer manufacture, a significant fraction of the 430 nm light absorption of the particles is attributable to pigment particles whose size exceeds 400 nm—if the Guinness® Draught Beer were to be filtered to 400 nm, these pigment particles would be removed. The present inventor therefore believes an EBC:viscosity ratio obtainable for 400 nm-filtered Guinness® Draught Beer is significantly less than 75 (centipoise)$^{-1}$;

Alternative B—concentrated Guinness® Beer (i.e. not filtered after purchase)—by subjecting the aforementioned commercially available Guinness® Draught Beer to evaporation, both the concentration of colorant therein and the viscosity increase. When the commercially available Guinness® Draught Beer was concentrated sufficiently to bring the EBC number to 1365, the 25° C. viscosity increased to about 15 centipoise. In this example, the EBC:viscosity ratio is about 90. For reasons explained in the previous paragraph, the present inventor therefore believes an EBC:viscosity ratio obtainable for 400 nm-filtered Guinness® Draught Beer (i.e. which is also evaporated to concentrate the colorant) is significantly less than 90 (centipoise)$^{-1}$;

Alternative C—the sweet commercially available malt syrup (i.e. the Briess® CBW special dark Malt discussed in the background section)—this malt syrup has an EBC number of about 3000 and a 25° C. viscosity that exceeds 12,000 centipoise. In this example, the EBC:viscosity ratio was actually less than one (centipoise)$^{-1}$.

Alternative D—diluted Briess® CBW special dark Malt—by diluting (i.e. with water the commercially available Briess® CBW special dark Malt, the both the viscosity and the EBC number decrease. When the commercially available Briess® CBW special dark Malt was diluted sufficiently to decrease the 25° C. viscosity to about 3.5 centipoise, the EBC number was reduced to about 90. In this example, the EBC:viscosity ratio is about 26 (centipoise)$^{-1}$.

Note about Alternatives A and B (and beer vs. unfermented wort)—as noted above, not only must sufficient colorant be present in the wort to produce an EBC exceeding 1600 (and preferably about 1800) in the final ink formulation at the desired viscosity level, but this colorant must be in the form of sub-400 nm (or sub-300 nm or sub-200 nm) nano-pigments and/or dye. This is because larger pigment particles are pre-filtered from the ink formulation.

Not wishing to be bound by theory, the inventor believes that (i) the unfermented worts of the presently-disclosed ink formulation include a high concentration of colorants in the form of sub-400 nm (or sub-300 nm or sub-200 nm) nano-pigments and/or dye; and (ii) in contrast, in beer which is fermented, a higher fraction of colorants are pigments whose size exceeds sub-400 nm, limiting a EBC:viscosity ratio of beer-based formulations to values significantly below 300 (centipoise)$^{-1}$.

In different embodiments, the unfermented wort may be produced from barley, wheat, rye, corn, rice, oats and/or any other grain—e.g. malted and/or roasted grain.

When the wort is the 'primary colorant of the ink formulation', this means that a presence of the wort in the formulation contributes at least 75% or at least 80% or at least 85% or at least 90% or at least 95% or at least 97%) of the light absorbance of the ink formulation at 430 nanometers.

Embodiments of the invention relate to manufacturing any presently disclosed ink formulation—e.g. by contacting a grain (e.g. roasted and/or malted) (e.g. having a degrees Lovibond of at least 300) with an aqueous solution so that colorant migrates from the grain into the solution. For example, a humectant and/or pH controlling agent is added. For example, the formulation is subjected to a separation process to separate out larger particles. For example, the formulation is loaded into an ink-jet cartridge.

Embodiments of the present invention relate to an article of manufacture comprising: a. an ink-jet cartridge; and b. an unfermented-wort-based ink formulation disposed within the ink-jet cartridge, the ink formulation comprising: i. an unfermented wort; ii. a humectant for providing moisture-retention; and iii. a pH controlling agent for maintaining a pH of the ink formulation between 2.0 and 4.0, wherein ink formulation is edible, aqueous and has at any combination of the following structural properties:

A. the unfermented wort is the primary colorant of the ink formulation; and/or

B. a 25° C. viscosity of the ink formulation is at most 5.5 centipoise (e.g. at most 4.5 centipoise or at most 4 centipoise or at most 3.5 centipoise—for example, between 2 and 5.5 cP or between 2 and 5 cP or between 2 and 4.5 cP or between 2 and 4 cP or between 2 and 3.5 cP); and/or C. the ink formulation is characterized by at least an EBC (European Brewing Convention) number of at least 1800 colorant units (e.g. at least 1900 colorant units or at least 2000 colorant units or at least 2100 colorant units); and/or D. the ink formulation is characterized by at least an EBC (European Brewing Convention) number of at most 3200 colorant units (e.g. at most 3000 or at most 2800 or at most 2600 colorant units); and/or E. a ratio between the EBC number of the ink formulation and the 25° C. viscosity thereof is at least 300 (centipoise)$^{-1}$ or at least 350 (centipoise)$^{-1}$ or at least 400

(centipoise)$^{-1}$ or at least 450 (centipoise)$^{-1}$ or at least 500 (centipoise)$^{-1}$ or at least 550 (centipoise)$^{-1}$ and optionally at most 800 (centipoise)$^{-1}$ or at most 750 (centipoise)$^{-1}$ at most 700 (centipoise)$^{-1}$ at most 650 (centipoise)$^{-1}$ at most 600 (centipoise)$^{-1}$;

F. the ink formulation comprises at least 8% wt/wt carbohydrates or at least 10% wt/wt or at least 12% wt/wt or at least 14% or at least 16% wt/wt and optionally most 25% wt/wt or at most 23% wt/wt or at most 22% wt/wt or at most 20% wt/wt) carbohydrates (i.e. at most only a fraction of which are soluble sugars)

G. the ink formulation comprises sub-micron particles (e.g. at least some of which are Maillard pigment particles—e.g. from the unfermented wort); and H. at least 60% or at least 70% or at least 80% or at least 90% of particles of the ink formulation are sub-X nanometer particles (e.g. X is selected from the group consisting of 400, 350, 300, 250, 200).

I. at least 60% or at least 70% or at least 80% or at least 90% of sub-micron particles of the ink formulation are sub-X nanometer particles (e.g. X is selected from the group consisting of 400, 350, 300, 250, 200);

J. at least 60% or at least 70% or at least 80% or at least 90% of particles of the ink formulation are sub-X nanometer particles (e.g. X is selected from the group consisting of 400, 350, 300, 250, 200).

In some embodiments, the ink formulation further has at least one of the following compound-related properties:

AA. a ratio between a wt/wt % concentration of soluble sugars and a wt/wt concentration of carbohydrates in the ink formulation is at most 0.2 (e.g. at most 17.5 or at most 0.15 or at most 0.125 or at most 0.1 or at most 0.075 or at most 0.06 or at most 0.05 or at most 0.04 or at most 0.03); and/or BB. a ratio between a wt/wt % concentration of maltose and a wt/wt concentration of carbohydrates in the ink formulation is at most 0.2 (e.g. at most 17.5 or at most 0.15 or at most 0.125 or at most 0.1 or at most 0.075 or at most 0.06 or at most 0.05 or at most 0.04 or at most 0.03); and/or CC. a ratio between a wt/wt % concentration of soluble amino acid compounds and a wt/wt concentration of carbohydrates in the ink formulation is at most 0.2 (e.g. at most 17.5 or at most 0.15 or at most 0.125 or at most 0.1 or at most 0.075 or at most 0.06 or at most 0.05 or at most 0.04 or at most 0.03); and/or DD. the ink compound comprises at most 2.5% wt/wt or at most 2% wt/wt or at most 1.5% wt/wt or at most 1.25% wt/wt or at most 1% wt/wt or at most 0.75% wt/wt soluble sugars; and/or EE. the ink compound comprises at most 2.5% wt/wt or at most 2% wt/wt or at most 1.5% wt/wt or at most 1.25% wt/wt or at most 1% wt/wt or at most 0.75% wt/wt maltose; and/or FF. the ink compound comprises at most 2.5% wt/wt or at most 2% wt/wt or at most 1.5% wt/wt or at most 1.25% wt/wt or at most 1% wt/wt or at most 0.75% wt/wt soluble amino acid compounds.

In contrast to the unmodified and modified draught Guinness® beer and the Briess® CBW special dark Malt example formulations presented in alternatives A-C above, embodiments of the presently disclosed ink formulation substantially lack particles whose size exceeds 400 nanometers, relying almost exclusively on dyes (i.e. formed from the highly-roasted malt—for example, caramel sourced from the malt) and sub-400 nanometer pigment particles (e.g. Malliard particles) as colorants.

As noted above, the presently-disclosed ink formulation (in embodiments thereof) is characterized by a EBC:Viscosity ratio of at least 400.

By relying on worts that are (i) both 'rich' in carbohydrates and 'poor' in soluble sugars and/or (ii) both 'rich' in carbohydrates and 'poor' in maltose and/or (ii) both 'rich' in carbohydrates and 'poor' in soluble amino acid compounds, it is possible to manufacture such an ink formulation. For example, this may be due to the extremely high concentration of malt-sourced dye (as opposed to large-particle pigment colorant) and/or high concentration of sub-100 nanometer Malliard particles in the wort, sufficient to provide (i.e. even after diluting with humectant) the meet the presently disclosed requirement that the EBC:Viscosity ratio to be equal to at least 300 (cp)$^{-1}$ or at least 350 (cp)$^{-1}$ or at least 400 (cp)$^{-1}$ or at least 450 (cp)$^{-1}$ or at least 500 (cp)$^{-1}$.

BRIEF DESCRIPTION OF EMBODIMENTS

Figure 1:
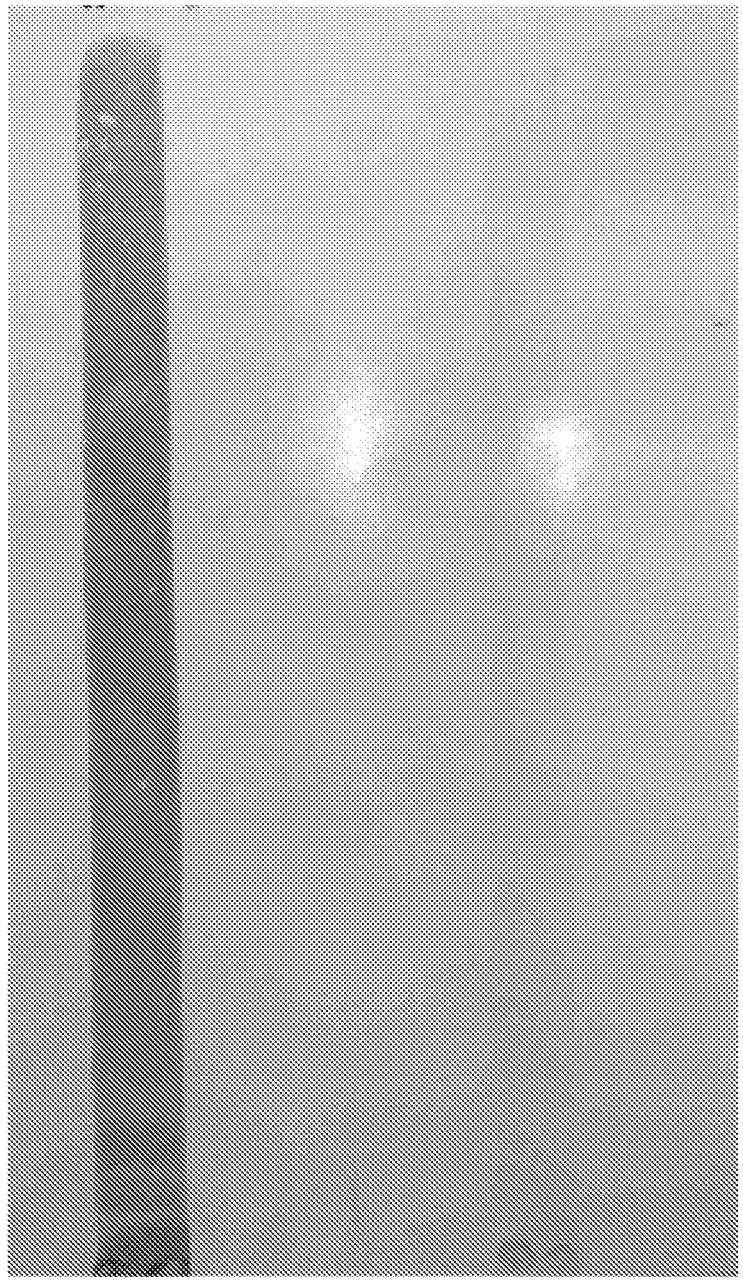
FIGS. 1-2 illustrate results of draw down experiments.

The formulations, articles of manufacture and methods according to the present invention may be better understood with reference to the drawings and the accompanying description. Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

Measuring Viscosity

As used herein, a viscosity refers to the viscosity at 25" C. Viscosity data for the any formulation disclosed herein may be determined using a Brookfield DV1 viscometer using a cone and plate spindle at 25° C. (±1° C.) at 50 rpm after 30 seconds or 60 rpm after 30 seconds.

Measuring Surface Tension:

The methodology used for measuring surface tension of ink is the Wilhelmy plate Method. The Wilhelmy plate method is a universal method especially suited to check surface tension over time intervals. In short, a vertical plate of known perimeter is attached to a balance, and the force due to wetting is measured. The equipment used and corresponding settings are as follows:

Device: Krüss Tensiometer K20, manufactured by Krüss GmbH, Plate Dimensions: Width: 19.9 nm Thickness: 0.2 mm, Height: 10 mm.

Measurement Settings: immersion depth 2 mm, Surface Detection Sensitivity 0.01 g, Surface Detection Speed 6 mm/min, Values 10, Acquisition linear, Max. Measurement Time 60 sec. The liquid to be measured is poured into a clean and thy glass vessel. The sample temperature is controlled at 25° C. The clean and annealed Wilhelmy plate is lowered to the surface of the liquid. The plate is immersed in the fluid to measure and the corresponding value of surface tension is read on the display of the device.

EBC Colour:

The Colour of beer is an important Parameter at the quality control of Beer during the brew process. To measure EBC colour, the light absorption is detected at 430 nm. The beer/wort samples will be filtered to get a turbidity of less than 1 EBC during the laboratory procedure of EBC colour measurement. Then the absorption is measured in a 10 mm cuvette. The sample is diluted with water until the absorption is less than 2 Extinction units (E430).

EBC colour=E430×25×dilution factor.

The dilution factor is 90.

Solids and Percent Solids

For the present document, 'solids' refers to material which is solid at 60 degrees Celsius.

Measuring Light Absorbance

Light absorbance of the solution, is a common measurement technique employed to monitor optical characteristics of samples. The ink samples contain an analyte species dissolved in a solvent at an unknown concentration. The concentration of the analyte in a sample may be determined by using a photometric device to measure the fraction of light absorbed by the sample at a specific wavelength ($\lambda$). The value of $\lambda$ is usually chosen to be near the wavelength of light where the analyte absorbs maximally. According to the Beer-Lambert law. The value of the ink is measured with a photometric apparatus, such as a photometer or spectrophotometer, equipped with a fixed light path sample-retaining device called a cuvette, such as a 1 cm light absorption pathlength cuvette (10 mm cuvette). The sample-retaining device contains a sample comprised of analyte dissolved in a solvent. The value of $I_O$ is ordinarily measured with the same system (photometric apparatus, sample-retaining device and solvent except that no analyte is present in the solvent. Alternatively, $I_O$ may be measured in the absence of both the sample and the sample-retaining device (this value of $I_O$ is called an "air blank"). When an "air blank" is employed, a separate $A_\lambda$ measurement of the solvent and sample-retaining device gives a "solvent blank" absorbance value. A "corrected absorbance" value related to absorbance of the analyte is then obtained by subtracting the "solvent blank" from each absorbance measurement made on the samples comprised of analyte dissolved in solvent and contained in the sample-retaining device.

Particle Size and Particle Size Distribution

Particle size may be determined according to measurement of particle size distributions. Particle size distribution may be measured using DLS (dynamic light scattering techniques). Dynamic light scattering (DLS), sometimes referred to as Quasi Elastic Light Scattering (QELS), is a non-invasive, well-established technique for measuring the size and size distribution of molecules and particles typically in the submicron region. For example, devices for measuring particle size are available from Malvern Panalytical of Malvern (United Kingdom).

Unless specified otherwise, a particle size distribution (or any related parameter—e.g. the fraction or percentage of particles that have a certain size) refers to measurement by volume.

Exemplary Techniques for Measuring Nutritional Information

The method uses the CEM Sprint Protein Analyzer (CEM Corp., Matthews, NC, USA). The method is based on protein-tagging technology where the sample is mechanically mixed with an anionic dye that binds to cationic groups of the basic amino acid residues (histidine, arginine, and lysine) and to free amino terminal groups. The amount of unbound dye remaining in solution after the insoluble protein has been removed by filtration is determined by measuring its absorbance. The amount of protein present in the original solution is proportional to the amount of dye removed from the solution. Only the free amino acid or protein will react to this hydrolysis method and the Nitrogen which is bonded to the caramel or to the milliard particle will not react to the tagging of the dye.

Total carbohydrate content of foods has, for many years, been calculated by difference, rather than analyzed directly. Under this approach, the other constituents in the food (protein, fat, water, alcohol, ash) are determined individually, summed and subtracted from the total weight of the food. This is referred to as total carbohydrate by difference and is calculated by the following formula:

100−(weight in grams[protein+fat+water+ash] in 100 g of food)_ e.g.: 100-80.8 (water)-0.52 (protein)-0.9 (Fat)-0.3 (Ash)=17.5 Total Carbohydrate.

It should be clear that carbohydrate estimated in this fashion includes fiber, as well as some components that are not strictly speaking carbohydrate, e.g. organic acids (Merrill and Watt, 1973). Total carbohydrate can also be calculated from the sum of the weights of individual carbohydrates and fiber after each has been directly analyzed.

EXAMPLES

The following examples are intended to illustrate certain embodiments of the present invention, but do not exemplify the full scope of the invention. Non-limiting embodiments of the present invention will be described by way of example with reference to the accompanying figures, which are schematic and are not intended to be drawn to scale.

Example 1—Preparation of an Unfermented Wort

Pre-ground malted and roasted grains having an extremely high (i.e. >300°) Lovibond value is obtained from a supplier.

2 kg of the pre-7ground roasted and malted grains were boiled in 10 kg of water for 1 hour or more in a pressure cooker at 105-110° C. until obtaining 15.5° Brix malt extract. (water is evaporated or added until 15.5° Brix is obtained). A non-limiting list of mins that may be used to manufacture the unfermented wort is provided below.

| Grain Name | °L |
| --- | --- |
| Blackprinz ®/Briess (item number 6643) | 500 |
| Midnight Wheat ®//Briess (item number 6629) | 550 |
| Weyermann Dehusked Carafa IT ® | 425 |
| Dingemans Debitter Black | 515 |
| Simpson Black (United Kingdom) | 550 |
| Dark Chocolate /Briess (item number 5570) | 420 |
| Black Barley/Briess (item number 7047) | 500 |
| Weyennann Dehusked Carafa I ® | 337 |
| Weyermann Dehusked Carafa II ® | 425 |
| Weyermann Dehusked Carafa III ® | 470 |

-continued

| Grain Name | °L |
|---|---|
| Weyermann ® CARAFA ® Type 3 | 490.6-566 |
| Weyermann ® Chocolate Wheat | 339.8-452.9 |
| Weyerma.nn ® Chocolate Rye | 189-302 |

The Lovibond values are all as reported by the manufacturer.

At this time, the preferred grain is Blackprinz®/Briess which is known as a 'debittered' grain, manufactured by removing a great deal of the husk.

Example 2—Addition of Humectant and pH Controlling Agent to Product an Unfiltered Ink Formulation Humectant and pH controlling agent are added to unfermented wort to produce an unfiltered ink formulation.

pH Controlling agent—A non-limiting list of pH controlling agents: Lemon concentrate (no e number-natural), citric acid (E330), ascorbic acid (E 300), acetic acid (E260), lactic acid (E270), tartaric acid (L(+)-) (E334), malic acid (E296) and fumaric acid (E297). For example, the pH controlling agent is used in amount that depends both and the pH control agent selected and the target pH. In different examples, the target pH is at most 3.8 or at most 3.5—e.g. between 2.0 and 3.5 or between 2.0 and 3.8 or between 2.5 and 3.5 or between 2.5 and 3.8. In different examples, the amount of pH controlling agent in the ink composition is between 0.5% wt/wt and 3.0% wt/wt.

At this time, the preferred pH controlling agent is citric acid.

Humectant—Humectant is added to retard the evaporation rate of the ink formulation, thereby preventing (or delaying) clogging of nozzles.

A non-limiting list of humectants: Fructose, Dextrose, Bee honey, Date honey, Maple syrup, Molasses, Cane sugar syrup, propylene glycol, Mannitol, Glucose, polyethylene glycol 200, polyethylene glycol 400, polyethylene glycol 600, Sucrose, polymeric polyols polydextrose, Quillaia, Sodium hexametaphosphate E452i), sugar alcohols (sugar polyols) (e.g. glycerol, sorbitol, xylitol, maltitol).

To date, the following humectants have been tested: bee honey, Date honey, molasses, cane sugar, glucose, sorbitol, glycerol, propylene glycol.

Typically, the humectant may increases the viscosity while possibly influencing the EBC number of the formulation. In some embodiments, a candidate humectant may be analyzed according both to its ability to increase moisture retention while minimally increasing the viscosity of the formulation—e.g. a relationship between these two properties may be analyzed. At this time, the preferred humectant is glycerol.

In one particular example, the ink formulation comprises 87% wt/wt wort from Blackprinz®/Briess, 10% wt/wt glycerol and 3% wt/wt citric acid.

Addition of these ingredients may reduce a light absorbance of at 430 nm and an EBC number of the formulation—e.g. by about 7%.

Example 3—First Filtration Step

The unfiltered ink formulation of Example 2 is passed through a ~3 micron filter to remove visible solids. This step reduces both an absorbance of the formulation at 430 nm and an EBC number of the formulation. Filters used in any of Examples 3-6 may be purchased, for example, from (i) the Parker Hannifin Corporation of Mayfield Heights Ohio (United States); (ii) Sterltech of Kent, Washington (United States), (iii) Thermofisher of Waltham, Massachusetts (United States) or (iv) MilliporeSigma of Burlington, Massachusetts (United States).

Example 4—Second Filtration Step

The filtered ink formulation of Example 2 is passed through a ~0.4-~0.5 micron filter (e.g. a polyethersulfone (PES) membrane)).

Example 5—Third Filtration Step

The filtered ink formulation of Example 3 is passed through a ~0.2 micron filter.

Example 6—Fourth Filtration Step

The filtered ink formulation of Example 5 is passed through a ~0.1 micron filter.

Example 7—Analysis of Ink Formulations

The light absorbance at 430 nm (dilution factor=90), the EBC number and the viscos (measured at 25° C.) were measured for a number of formulations. The results are presented in the following table. Each formulation was filtered to 200 nm (0.2 microns) (see example 5).

| Formulation | Grain Source | Light Absorbance at 430 nm | EBC number | Viscosity (centipoise) | EBC:Viscosity Ratio |
|---|---|---|---|---|---|
| A | Blackprinz ®/Briess | 1.08 | 2430 | 71-74.5 | At least 694 |
| B | Weyemiann Dehusked Carafa II ® | 0.85 | 1912 | 3-3.5 | At least 546 |
| C | Weyemiann ® Chocolate Wheat | 0.81 | 1822 | 3-3.5 | At least 520 |
| D | Weyertnatink ® Chocolate Rye | 0.6 | 1350 | 3-3.5 | At least 385 |

For each example in the table below, the formulation comprises about 87.5% wt/wt worn, 10% wt/wt glycerol and 2.5% wt/wt citric acid. The pH was between 3 and 3.5. and the surface tension was between 40 and 45 dynes/cm.

Example 8—Introducing the Ink Jet Formulation into an Ink-Jet Cartridge

The unfermented-wort-based ink formulation were loaded into a thermal ink jet cartridge and then tested as a printing ink in a thermal ink jet printer. The preferred ink jet cartridge is Enhanced 45si HP Thermal Inkjet technology (TIJ) print cartridge available from the Hewlett-Packard corporation of Palo Alto, California (e.g. nozzle size 45 microns).

Due to the elevated EBC number, it is possible to print high quality images (at 600 dots-per-inch (dpi)) even when only a single droplet is deposited per pixel (i.e. single pass). Due to the viscosity and surface tension, it might be useful to eject the droplets using elevated voltage (e.g. between 11 and 11.5 volts).

Example 9—Beer-Based Ink Formulations (Not in Accordance with the Invention)

Two beer-based ink formulations were prepared—the first formulation was simply Guinness® draught beer. The first beer-based formulation has a viscosity of 1.5 centipoise and an EBC number of 110 EBC colorant units. To obtain the second formulation, some of the Guinness® beer of the first formulation was left out and allowed it to evaporate at room temperature so that between 50% and 60% of the water is lost—this increase the viscosity from about 1.5 cP to 15.5 cP and the EBC number from 110 EBC units to 1365 Colorant units.

Example 10—Draw Down Experiment

PrintWiki describes draw down experiments as
A means of evaluating the color mixing of a printing ink by depositing a layer of the mixed ink on the surface of a substrate using a smooth-edged knife. Drawdown is one of three basic tests used to determine the accuracy of color matching and mixing processes, the compatibility of the various inks combined, the performance of the ink on the substrate, and the drying characteristics of the ink. Drawdown is also called pulldown Three formulations were subjected to a draw down experiments—(i) a formulation based on Blackprinz®/Briess grain filtered to 0.2 microns; (ii) unmodified Guinness® draught beer (the first formulation of Example 9); and (iii) evaporated Guinness® draught beer (the second formulation of Example 9).

Figure 2:

The results are illustrated in FIGS. 1-2. As shown in FIG. 1, the Unmodified Guinness® draught Beer is unacceptable for ink-jet—the optical density is simply too low. Although the optimal density of evaporated/concentrated Guinness® draught Beer does not suffer this deficiency (see FIG. 2), the viscosity is simply too high for thermal ink-jet.

Example 11—Printing Two Images Using a Thermal Ink-Jet Printer

Two formulations were manufactured in accordance with Examples 1-5. Each formulation was loaded into a respective ink-jet cartridge in accordance with Example 5. The same image was printed using an ink jet printer on a target beer beverage having a head of carbon-dioxide based beer foam. The results are illustrated FIGS. 3-4.

Figure 3:
FIGS. 3-4 are photographs of ink jet images that are printed on a foamed beverage, in this case beer with a carbon-dioxide-based foam.

The first formulation, used to produce the ink jet image of FIG. 3 is based on Blackprinz®/Briess grain (dehusked).

Figure 4:

The second formulation, used to produce the ink-jet image of FIG. 4 is based on Weyermann® CARAFA® Type 3 grain (not dehusked).

Not wishing to bound by theory, the inventor believes that the formulation based dehusked grain is less likely to act as an anti-foam agent for carbon-dioxide based beer foam. In contrast and as shown in FIG. 4, formulation based on grain that is not dehusked are more likely to consummate the $CO_2$-based beer foam upon contact (e.g. due to a higher concentration of Arabinoxylan(s) and/or derivatives thereof and/or related compounds).

Example 12—Nutrition Information of an Ink Formulation Based on Blackprinz®/Briess Grain An ink formulation based on Blackprinz®/Briess grain was manufactured according to Examples 1-2. The ink formulation comprises 87% wt/wt wort from Blackprinz®/Briess, 10% wt/wt glycerol and 3% wt/wt citric acid. This ink formulation was filtered according to Examples 3-5. The ink formulation was then subjected to nutritional analysis.

Soluble Sugars

The results for soluble sugars were follows:
A) Fructose <0.1 grams/100 grams of ink formulation (limit of detection 0.1 grams/100 grams);
B) Glucose <0.1 grams/100 grams of ink formulation (limit of detection 0.1 grams/100 grams);
C) Sucrose <0.2 grams/100 grams of ink formulation (limit of detection 0.2 grams/100 grams);
E) Lactose <0.2 grams/100 grams of ink formulation(limit of detection 0.2 grams/100 grams);
E) Maltose <0.2 grams/100 grams of ink formulation (limit of detection 0.2 grams/100 grams);
Total soluble sugars—<0.8 grams per 1000 grams of ink formulation (limit of detection 0.8 grams/100 grams).

Soluble Amino Acid Compounds

It was found that the formulation contains about 0.5 grams of soluble amino acid compounds per 100 grams of ink formulation.

Moisture

It was found that the formulation contains 80% moisture per 100 grams of ink formulation.

Total Carbohydrates

It was found that the formulation contains carbohydrates per 100 grams of ink formulation.

Additional Discussion

There is therefore provided, in accordance with an inventive concept 1 of the present invention, an unfermented-wort-based ink formulation comprising:
  i. an unfermented wort;
  ii. a humectant for providing moisture-retention; and
  wherein ink formulation is edible, aqueous and has at least one of the following structural properties:
  PROPERTY A: the unfermented wort is the primary colorant of the ink formulation;
  PROPERTY B: a 25° C. viscosity of the ink formulation is at most 5.5 centipoise;
  PROPERTY C: the ink formulation is characterized by an EBC (European Brewing Convention) number of at least 1600 colorant units;
  PROPERTY D: a ratio between the EBC number of the ink formulation and the 25° C. viscosity thereof is at least 300 (centipoise)$^{-1}$;

PROPERTY E: the ink formulation comprises at least 10% wt/wt carbohydrates;

PROPERTY F: the ink formulation is sugar-poor such that a ratio between a wt/wt % concentration of soluble sugars and a wt/wt concentration of carbohydrates in the ink formulation is at most 0.2; and PROPERTY G: the ink formulation is sugar-poor such that a ratio between a wt/wt % concentration of maltose and a wt/wt concentration of carbohydrates in the ink formulation is at most 0.2; and PROPERTY H: the ink formulation is sugar-poor such that a ratio between a wt/wt % concentration of soluble amino acid compounds and a wt/wt concentration of carbohydrates in the ink formulation is at most 0.2; and PROPERTY I: at least 60% of particles of the ink formulation are sub-400 nanometer particles (e.g. Malliard particles);

PROPERTY J: a pH of the ink formulation is at most 4.5;

PROPERTY K: a pH of the ink formulation is at most 4.25;

PROPERTY L: a pH of the ink formulation is at most 4.0; and

PROPERTY M: a pH of the ink formulation is at least 2.0.

Inventive Concept 2. The ink formulation of any preceding Inventive Concept having at least property A.

Inventive Concept 3. The ink formulation of any preceding Inventive Concept having at least property B.

Inventive Concept 4. The ink formulation of any preceding Inventive Concept having at least property C.

Inventive Concept 5. The ink formulation of any preceding Inventive Concept having at least property D.

Inventive Concept 6. The ink formulation of any preceding Inventive Concept having at least property E.

Inventive Concept 7. The ink formulation of any preceding Inventive Concept having at least property F.

Inventive Concept 8. The ink formulation of any preceding Inventive Concept having at least property G.

Inventive Concept 9. The ink formulation of any preceding Inventive Concept having at least property H.

Inventive Concept 11. The ink formulation of any preceding Inventive Concept having at least property I.

Inventive Concept 12. The ink formulation of any preceding Inventive Concept having at least property J.

Inventive Concept 13. The ink formulation of any preceding Inventive Concept having at least property K.

Inventive Concept 14. The ink formulation of any preceding Inventive Concept having at least property L.

Inventive Concept 15. The ink formulation of any preceding Inventive Concept having at least property M.

Inventive Concept 16. The ink formulation of any preceding Inventive Concept further comprising a pH controlling agent for maintaining a pH of the ink formulation at or below 4.0. There is therefore provided, in accordance with an inventive concept 17 of the present invention, an edible and aqueous unfermented-wort-based ink formulation comprising:
  i. an unfermented wort; and
  ii. a humectant for providing moisture-retention.

Inventive Concept 18. The ink formulation of any preceding Inventive Concept the unfermented wort is the primary colorant of the ink formulation.

Inventive Concept 19. The ink formulation of any preceding Inventive Concept, wherein a 25° C. viscosity of the ink formulation is at most 12 centipoise (cP), or at most 10 cP, or at most 8 cP, or at most 6 cP.

Inventive Concept 20. The ink formulation of any preceding Inventive Concept, wherein a 25° C. viscosity of the ink formulation is at most 5.5 cP.

Inventive Concept 21. The ink formulation of any preceding Inventive Concept, wherein a 25° C. viscosity of the ink formulation is at most 5 cP.

Inventive Concept 22. The ink formulation of any preceding Inventive Concept, wherein a 25° C. viscosity of the ink formulation is at most 4 cP.

Inventive Concept 23. The ink formulation of any preceding Inventive Concept, wherein a 25° C. viscosity of the ink formulation is at most 3.5 cP.

Inventive Concept 24. The ink formulation of any preceding Inventive Concept, wherein a 25° C. viscosity of the ink formulation is at least 2 cP or at least 2.5 cP or at least 3 cP.

Inventive Concept 25. The ink formulation of any preceding Inventive Concept, wherein the wort contributes at least 80% of the light absorbance of the ink formulation at 430 nanometers.

Inventive Concept 26. The ink formulation of any preceding Inventive Concept wherein the wort contributes at least 90% of the light absorbance of the ink formulation at 430 nanometers.

Inventive Concept 27. The ink formulation of any preceding Inventive Concept wherein the ink formulation is characterized by an EBC (European Brewing Convention) number of at least 1600 colorant units.

Inventive Concept 28. The ink formulation of any preceding Inventive Concept wherein the ink formulation is characterized by an EBC (European Brewing Convention) number of at least 1800 colorant units.

Inventive Concept 29. The ink formulation of any preceding Inventive Concept wherein the ink formulation is characterized by an EBC (European Brewing Convention) number of at least 2000 colorant units.

Inventive Concept 30. The ink formulation of any preceding Inventive Concept wherein the ink formulation is characterized by an EBC (European Brewing Convention) number of at least 2200 colorant units.

Inventive Concept 31. The ink formulation of any preceding Inventive Concept wherein the ink formulation is characterized by an EBC (European Brewing Convention) number of at most 3000 colorant units.

Inventive Concept 32. The ink formulation of any preceding Inventive Concept wherein the ink formulation is characterized by an EBC (European Brewing Convention) number of at most 2800 colorant units.

Inventive Concept 33. The ink formulation of any preceding Inventive Concept wherein the ink formulation is characterized by an EBC (European Brewing Convention) number of at most 2600 colorant units.

Inventive Concept 33. The ink formulation of any preceding Inventive Concept wherein the ink formulation is characterized by an EBC (European Brewing Convention) number of at most 2600 colorant units.

Inventive Concept 34. The ink formulation of any preceding Inventive Concept wherein ratio between (i) a light absorbance of the ink formulation at 530 nanometers and (ii)) a light absorbance of the ink formulation at 430 nanometers is at most 0.6.

Inventive Concept 35. The ink formulation of any preceding Inventive Concept wherein ratio between (i) a light absorbance of the ink formulation at 530 nanometers and (ii)) a light absorbance of the ink formulation at 430 nanometers is at most 0.4.

Inventive Concept 36. The ink formulation of any preceding Inventive Concept wherein ratio between (i) a light absorbance of the ink formulation at 530 nanometers and (ii)) a light absorbance of the ink formulation at 430 nanometers is at most 0.3.

Inventive Concept 36. The ink formulation of any preceding Inventive Concept wherein a ratio between the EBC number of the ink formulation and the 25° C. viscosity thereof is at least 200 (centipoise)$^{-1}$.

Inventive Concept 37. The ink formulation of any preceding Inventive Concept wherein a ratio between the EBC number of the ink formulation and the 25° C. viscosity thereof is at least 250 (centipoise)$^{-1}$.

Inventive Concept 38. The ink formulation of any preceding Inventive Concept wherein a ratio between the EBC number of the ink formulation and the 25° C. viscosity thereof is at least 300 (centipoise)$^{-1}$.

Inventive Concept 39. The ink formulation of any preceding Inventive Concept wherein a ratio between the EBC number of the ink formulation and the 25° C. viscosity thereof is at least 350 (centipoise)$^{-1}$.

Inventive Concept 40. The ink formulation of any preceding Inventive Concept wherein a ratio between the EBC number of the ink formulation and the 25° C. viscosity thereof is at least 400 (centipoise)$^{-1}$.

Inventive Concept 41. The ink formulation of any preceding Inventive Concept wherein a ratio between the EBC number of the ink formulation and the 25° C. viscosity thereof is at least 450 (centipoise)$^{-1}$.

Inventive Concept 42. The ink formulation of any preceding Inventive Concept wherein a ratio between the EBC number of the ink formulation and the 25° C. viscosity thereof is at least 500 (centipoise)$^{-1}$.

Inventive Concept 43. The ink formulation of any preceding Inventive Concept wherein a ratio between the EBC number of the ink formulation and the 25° C. viscosity thereof is at least 550 (centipoise)$^{-1}$.

Inventive Concept 44. The ink formulation of any preceding Inventive Concept wherein a ratio between the EBC number of the ink formulation and the 25° C. viscosity thereof is at least 600 (centipoise)$^{-1}$.

Inventive Concept 45. The ink formulation of any preceding Inventive Concept wherein a ratio between the EBC number of the ink formulation and the 25° C. viscosity thereof is at most 1000 (centipoise)$^{-1}$.

Inventive Concept 46. The ink formulation of any preceding Inventive Concept wherein a ratio between the EBC number of the ink formulation and the 25° C. viscosity thereof is at most 800 (centipoise)$^{-1}$.

Inventive Concept 47. The ink formulation of any preceding Inventive Concept wherein a ratio between the EBC number of the ink formulation and the 25° C. viscosity thereof is at most 700 (centipoise)$^{-1}$.

Inventive Concept 48. The ink formulation of any preceding Inventive Concept wherein the ink formulation comprises at least 8% wt/wt carbohydrates.

Inventive Concept 49. The ink formulation of any preceding Inventive Concept wherein the ink formulation comprises at least 8% wt/wt carbohydrates.

Inventive Concept 50. The ink formulation of any preceding Inventive Concept wherein the ink formulation comprises at least 8% wt/wt carbohydrates.

Inventive Concept 51. The ink formulation of any preceding Inventive Concept wherein the ink formulation comprises at least 10% wt/wt carbohydrates.

Inventive Concept 52. The ink formulation of any preceding Inventive Concept wherein the ink formulation comprises at least 12% wt/wt carbohydrates.

Inventive Concept 53. The ink formulation of any preceding Inventive Concept wherein the ink formulation comprises at least 14% wt/wt carbohydrates.

Inventive Concept 54. The ink formulation of any preceding Inventive Concept wherein the ink formulation comprises at least 16% wt/wt carbohydrates.

Inventive Concept 55. The ink formulation of any preceding Inventive Concept wherein the ink formulation comprises at most 25% wt/wt carbohydrates.

Inventive Concept 56. The ink formulation of any preceding Inventive Concept wherein the ink formulation comprises at most 22% wt/wt carbohydrates.

Inventive Concept 57. The ink formulation of any preceding Inventive Concept wherein the ink formulation comprises at least 20% wt/wt carbohydrates.

Inventive Concept 54. The ink formulation of any preceding Inventive Concept wherein the ink formulation comprises sub-micron particles (e.g. at least some of which are Maillard pigment particles.

Inventive Concept 55. The ink formulation of any preceding Inventive Concept wherein at least 60% (e.g. at least 70% or at least 80% or at least 90%) of sub-micron particles of the ink formulation are sub-400 nanometer particles (e.g. Malliard particles).

Inventive Concept 55B. The ink formulation of any preceding Inventive Concept wherein at least 60% (e.g. at least 70% or at least 80% or at least 90%) of particles of the ink formulation are sub-400 nanometer particles (e.g. Malliard particles).

Inventive Concept 56. The ink formulation of any preceding Inventive Concept wherein a ratio between a wt/wt % concentration of soluble sugars and a wt/wt concentration of carbohydrates in the ink formulation is at most 0.2.

Inventive Concept 57. The ink formulation of any preceding Inventive Concept wherein a ratio between a wt/wt % concentration of maltose and a wt/wt concentration of carbohydrates in the ink formulation is at most 0.2; and Inventive Concept 58. The ink formulation of any preceding Inventive Concept wherein a ratio between a wt/wt % concentration of soluble amino acid compounds and a wt/wt concentration of carbohydrates in the ink formulation is at most 0.2.

Inventive Concept 59. The ink formulation of any preceding Inventive Concept comprising a pH controlling agent for maintaining a pH of the ink formulation between 2.0 and 4.5—e.g. at least 2.5 or at least 2.75 or at least 3—alternatively or additionally at most 4.25 or at most 4 or at most 3.75 or at most 3.

Inventive Concept 60. The ink formulation of any preceding Inventive Concept wherein the 25° C. viscosity of the ink formulation is at most 5 centipoise (cP) or at most 4.75 cP or at most 4.5 cP or at most 4.25 cP or at most 3 cP or at most 3.75 cP or at most 3.

Inventive Concept 61. The ink formulation of any preceding Inventive Concept wherein the 25° C. viscosity of the ink formulation is at least 2 centipoise (cP) or at least 2.25 cP or at least 2.5 cP.

Inventive Concept 62. The ink formulation of any preceding Inventive Concept wherein the ink formulation is characterized by at least an EBC (European Brewing Convention) number of at least 1800 colorant units or at least 1900 colorant units or at least 2000 colorant units or least 2100 colorant units or at least 2200 colorant units.
Inventive Concept 63. The ink formulation of any preceding Inventive Concept wherein the ink formulation is characterized by at least an EBC (European Brewing Convention) number of at most 3000 colorant units or at most 2800 colorant units or at most 2600 colorant units or at most 2500 colorant units.
Inventive Concept 64. The ink formulation of any preceding Inventive Concept wherein the ratio between the EBC number of the ink formulation and the 25° C. viscosity thereof is at least 350 $cp^{-1}$ or at least 400 $cp^{-1}$ or at least 420 $cp^{-1}$ or at least 450 $cp^{-1}$ or at least 475 $cp^{-1}$ or at least 500 $cp^{-1}$ or at least 525 $cp^{-1}$ or at least 550 $cp^{-1}$.
Inventive Concept 65A. The ink formulation of any preceding Inventive Concept wherein at least 60% (e.g. at least 70% or at least 80% or at least 90%) of particles of the ink formulation are sub-400 nm particles (e.g. Malliard particles);
Inventive Concept 65B. The ink formulation of any preceding Inventive Concept wherein at least 60% (e.g. at least 70% or at least 80% or at least 90%) of the sub-micron particles of the ink formulation are sub-400 nm particles (e.g. Malliard particles);
Inventive Concept 65BB. The ink formulation of any preceding Inventive Concept wherein at least 60% (e.g. at least 70% or at least 80% or at least 90%) of particles of the ink formulation are sub-400 nm particles (e.g. Malliard particles);
Inventive Concept 65C. The ink formulation of any preceding Inventive Concept wherein at least 60% (e.g. at least 70% or at least 80% or at least 90%) of the sub-micron particles of the ink formulation are sub-300 nm particles (e.g. Malliard particles);
Inventive Concept 65D. The ink formulation of any preceding Inventive Concept wherein at least 60% (e.g. at least 70% or at least 80% or at least 90%) of the particles of the ink formulation are sub-300 nm particles (e.g. Malliard particles);
Inventive Concept 66A. The ink formulation of any preceding Inventive Concept wherein at least 60% (e.g. at least 70% or at least 80% or at least 90%) of the sub-micron particles of the ink formulation are sub-200 nanometer particles (e.g. Malliard particles);
Inventive Concept 66B. The ink formulation of any preceding Inventive Concept wherein at least 60% (e.g. at least 70% or at least 80% or at least 90%) of the particles of the ink formulation are sub-200 nanometer particles (e.g. Malliard particles); Inventive Concept 67. The ink formulation of any preceding Inventive Concept wherein the ratio between a wt/wt % concentration of soluble sugars and a wt/wt concentration of carbohydrates in the ink formulation is at most 0.175 or at most 0.15 or at most 0.125 or at most 0.1 or at most 0.075 or at most 0.05 or at most 0.025. Inventive Concept 68. The ink formulation of any preceding Inventive Concept wherein the ratio between a wt/wt % concentration of maltose and a wt/wt concentration of carbohydrates in the ink formulation is at most 0.175 or at most 0.15 or at most 0.125 or at most 0.1 or at most 0.075 or at most 0.05 or at most 0.025. Inventive Concept 69. The ink formulation of any preceding Inventive Concept wherein the ratio between a wt/wt % concentration of soluble amino acid compounds and a wt/wt concentration of carbohydrates in the ink formulation is at most 0.175 or at most 0.15 or at most 0.125 or at most 0.1 or at most 0.075 or at most 0.05 or at most 0.025. Inventive Concept 70. The ink formulation of any preceding Inventive Concept wherein the ink formulation comprises at least 5% wt/wt or at least 10% wt/wt solids or at least 15% wt/wt solids.
Inventive Concept 71. The ink formulation of any preceding Inventive Concept wherein the ink formulation comprises at least 5% wt/wt or at least 10% wt/wt solids or at least 15% wt/wt sub-micron particles.
Inventive Concept 72. The ink formulation of any preceding Inventive Concept wherein the ink formulation comprises at least 5% wt/wt solids.
Inventive Concept 73. The ink formulation of any preceding Inventive Concept wherein the ink formulation comprises at least 10% wt/wt solids.
Inventive Concept 74. The ink formulation of any preceding Inventive Concept wherein the ink formulation comprises at least 13% wt/wt solids.
Inventive Concept 75. The ink formulation of any preceding Inventive Concept wherein the ink formulation comprises at least 15% wt/wt solids.
Inventive Concept 76. The ink formulation of any preceding Inventive Concept wherein the ink formulation comprises at most 25% wt/wt solids.
Inventive Concept 76. The ink formulation of any preceding Inventive Concept wherein the ink formulation comprises at most 20% wt/wt solids.
Inventive Concept 77. The ink formulation of any preceding Inventive Concept wherein the ink formulation comprises at least 5% wt/wt sub-400 nm particles (e.g. Malliard particles);
Inventive Concept 78. The ink formulation of any preceding Inventive Concept wherein the ink formulation comprises at least 10% wt/wt sub-400 nm particles (e.g. Malliard particles);
Inventive Concept 79. The ink formulation of any preceding Inventive Concept wherein the ink formulation comprises at least 13% wt/wt sub-400 nm particles (e.g. Malliard particles);
Inventive Concept 81. The ink formulation of any preceding Inventive Concept wherein the ink formulation comprises at most 25% wt/wt sub-400 nm particles (e.g. Malliard particles);
Inventive Concept 82. The ink formulation of any preceding Inventive Concept wherein the ink formulation comprises at most 20% wt/wt sub-400 nm particles (e.g. Malliard particles);
Inventive Concept 83. The ink formulation of any preceding Inventive Concept wherein the ink formulation comprises at most 15% wt/wt sub-400 nm particles (e.g. Malliard particles);
Inventive Concept 84. The ink formulation of any preceding Inventive Concept wherein the ink formulation comprises at least 5% wt/wt sub-200 nm particles (e.g. Malliard particles);
Inventive Concept 85. The ink formulation of any preceding Inventive Concept wherein the ink formulation comprises at least 10% wt/wt sub-200 nm particles (e.g. Malliard particles);
Inventive Concept 86. The ink formulation of any preceding Inventive Concept wherein the ink formulation comprises at least 13% wt/wt sub-200 nm particles (e.g. Malliard particles);

Inventive Concept 87. The ink formulation of any preceding Inventive Concept wherein the ink formulation comprises at most 25% wt/wt sub-200 nm particles (e.g. Malliard particles);

Inventive Concept 88. The ink formulation of any preceding Inventive Concept wherein the ink formulation comprises at most 20% wt/wt sub-200 nm particles (e.g. Malliard particles);

Inventive Concept 89. The ink formulation of any preceding Inventive Concept wherein the ink formulation comprises at most 15% wt/wt sub-200 nm particles (e.g. Malliard particles);

Inventive Concept 90. The ink formulation of any preceding Inventive Concept wherein a surface tension of the formulation is at least 36 dynes/cm or at least 38 dynes/cm or at least 40 dynes/cm.

Inventive Concept 91. The ink formulation of any preceding Inventive Concept wherein a surface tension of the formulation is at most 50 dynes/cm or at most 48 dynes/cm or at most 45 dynes/cm or at most 44 dynes/cm.

Inventive Concept 92. The ink formulation of any preceding Inventive Concept wherein the ink formulation poor in soluble amino acid compounds such that a ratio between a wt/wt % concentration of soluble amino acid compounds in the ink formulation and a wt/wt concentration of carbohydrates in the ink formulation is at most 0.075, or at most 0.05.

Inventive Concept 93. The ink formulation of any preceding Inventive Concept wherein the pH controlling agent maintains the pH of the ink formulation (i) in the range of 2.0 to 4.0 or (ii) in the range of 2.0 to 3.8 or (iii) in the range of 2.0 to 3.6; or (iv) in the range of 2.0 to 3.5; or (v) in the range of 2.5 to 4.0 or (vi) in the range of 2.5 to 3.8 or (vi) in the range of 2.5 to 3.6; or (vii) in the range of 2.5 to 3.5; or (viii) in the range of 3.0 to 4.0 or (ix) in the range of 3.0 to 3.8 or (x) in the range of 3.0 to 3.6; or (xi) in the range of 3.0 to 3.5;

Inventive Concept 93. The article of manufacture of any of Inventive Concepts 1-6 wherein the pH controlling agent maintains the pH of the ink formulation (i) at or below 3.8 or (ii) at or below 3.8 or (iii) at or below 3.6.

Inventive Concept 94. The ink formulation of any preceding Inventive Concept wherein the ink formulation comprises at least 60% wt/wt water.

Inventive Concept 95. The ink formulation of any preceding Inventive Concept wherein the ink formulation comprises at least 65% wt/wt water.

Inventive Concept 96. The ink formulation of any preceding Inventive Concept wherein the ink formulation comprises at least 70% wt/wt water.

Inventive Concept 97. The ink formulation of any preceding Inventive Concept wherein the ink formulation comprises at least 75% wt/wt water.

Inventive Concept 98. The ink formulation of any preceding Inventive Concept wherein the ink formulation comprises at least 80% wt/wt water.

Inventive Concept 99. The ink formulation of any preceding Inventive Concept wherein the ink formulation comprises at most 90% wt/wt water.

Inventive Concept 100. The ink formulation of any preceding Inventive Concept wherein the ink formulation comprises at most 85% wt/wt water.

Inventive Concept 101. The ink formulation of any preceding Inventive Concept wherein the ink formulation comprises at most 80% wt/wt water.

Inventive Concept 102. The ink formulation of any preceding Inventive Concept wherein the 25° C. viscosity of the ink formulation is at most 4.25 centipoise (cP) or at most 3 cP or at most 3.75 cP or at most 3 cP.

Inventive Concept 103. The ink formulation of any preceding Inventive Concept wherein the 25° C. viscosity of the ink formulation is at least 2 centipoise (cP) or at least 2.25 cP or at least 2.5 cP.

Inventive Concept 104. The ink formulation of any preceding Inventive Concept wherein the ink formulation is characterized by at least an EBC (European Brewing Convention) number of at least 1800 colorant units or at least 2000 colorant units or least 2100 colorant units or at least 2200 colorant units.

Inventive Concept 105. The ink formulation of any preceding Inventive Concept wherein the ink formulation is characterized by at least an EBC (European Brewing Convention) number of at most 3000 colorant units or at most 2800 colorant units or at most 2600 colorant units or at most 2500 colorant units.

Inventive Concept 106. The ink formulation of any preceding Inventive Concept wherein the ratio between the EBC number of the ink formulation and the 25° C. viscosity thereof is at least 420 $cp^{-1}$ or at least 450 $cp^{-1}$ or at least 475 $cp^{-1}$ or at least 500 $cp^{-1}$ or at least 525 $cp^{-1}$ or at least 550 $cp^{-1}$.

Inventive Concept 107. The ink formulation of any preceding Inventive Concept wherein the ratio between the EBC number of the ink formulation and the 25° C. viscosity thereof is at most 1000 $cp^{-1}$ or at most 800 $cp^{-1}$ or at most 700 $cp^{-1}$.

Inventive Concept 108. The ink formulation of any preceding Inventive Concept wherein at least 70% or at least 80% or at least 90% of the particles of the ink formulation are sub-400 nanometer particles.

Inventive Concept 109. The ink formulation of any preceding Inventive Concept wherein at least 60% at least 70% or at least 80% or at least 90% of the particles of the ink formulation are sub-300 nanometer particles.

Inventive Concept 110. The ink formulation of any preceding Inventive Concept wherein at least 60% at least 70% or at least 80% or at least 90% of the particles of the ink formulation are sub-250 nanometer particles.

Inventive Concept 111. The ink formulation of any preceding Inventive Concept wherein at least 60% at least 70% or at least 80% or at least 90% of the particles of the ink formulation are sub-200 nanometer particles.

Inventive Concept 112. The ink formulation of any preceding Inventive Concept wherein the ink formulation comprises at least 5% wt/wt or at least 10% wt/wt solids or at least 15% wt/wt solids.

Inventive Concept 113. The ink formulation of any preceding Inventive Concept wherein the ink formulation comprises at least 5% wt/wt or at least 10% wt/wt or at least 15% wt/wt sub-micron particles.

Inventive Concept 114. The ink formulation of any preceding Inventive Concept wherein the ink formulation comprises at least 5% wt/wt or at least 10% wt/wt or at least 15% wt/wt sub-400 nm particles.

Inventive Concept 115. The ink formulation of any preceding Inventive Concept wherein the ink formulation comprises at least 5% wt/wt or at least 10% wt/wt or at least 15% wt/wt sub-300 nm particles.

Inventive Concept 116. The ink formulation of any preceding Inventive Concept wherein the ink formulation comprises at least 5% wt/wt or at least 10% wt/wt or at least 15% wt/wt sub-200 nm particles.

Inventive Concept 117. The ink formulation of any preceding Inventive Concept wherein the ink formulation comprises at most 25% wt/wt or at most 20% wt/wt solids.

Inventive Concept 118. The ink formulation of any preceding Inventive Concept wherein a ° Brix of the ink formulation is at least 14.

Inventive Concept 119. The ink formulation of any preceding Inventive Concept wherein a ° Brix of the ink formulation is at least 16.

Inventive Concept 120. The ink formulation of any preceding Inventive Concept wherein a ° Brix of the ink formulation is at least 18.

Inventive Concept 121. The ink formulation of any preceding Inventive Concept wherein a ° Brix of the ink formulation is at least 20.

Inventive Concept 122. The ink formulation of any preceding Inventive Concept wherein a ° Brix of the ink formulation is at most 30.

Inventive Concept 123. The ink formulation of any preceding Inventive Concept wherein a ° Brix of the ink formulation is at most 28.

Inventive Concept 124. The ink formulation of any preceding Inventive Concept wherein a ° Brix of the ink formulation is at most 26.

Inventive Concept 125. The ink formulation of any preceding Inventive Concept wherein a ° Brix of the ink formulation is at most 24.

Inventive Concept 126. The ink formulation of any preceding Inventive Concept wherein the wort is based on wheat or barley or oats or rye or rice or corn admixtures thereof.

Inventive Concept 127. The ink formulation of any preceding Inventive Concept wherein the wort is based on wheat or barley or admixtures thereof.

Inventive Concept 128. The ink formulation of any preceding Inventive Concept wherein the wort is based on a dehusked grain and/or a concentration of silicon ions within the formulation is at most 5 ppm.

Inventive Concept 129. The ink formulation of any preceding Inventive Concept wherein the ink formulation comprises at most 0.1% wt/wt artificial surfactants and/or at most 0.1% wt/wt dispersant and/or at most 0.1% wt/wt tween.

Inventive Concept 130. The ink formulation of any preceding Inventive Concept wherein the ink formulation comprises only GRAS (Generally Recognized as safe) ingredients.

Inventive Concept 131. The ink formulation of any preceding Inventive Concept wherein the wort contributes at least 80% of the light absorbance of the ink formulation at 430 nanometers.

Inventive Concept 132. The ink formulation of any preceding Inventive Concept wherein the wort contributes at least 90% of the light absorbance of the ink formulation at 430 nanometers.

Inventive Concept 133. The ink formulation of any preceding Inventive Concept wherein the wort contributes at least 95% of the light absorbance of the ink formulation at 430 nanometers.

Inventive Concept 134. An article of manufacture comprising: a. an ink-jet cartridge; and b. the unfermented-wort-based ink formulation of any preceding Inventive Concept disposed within the ink-jet cartridge.

Inventive Concept 135. An article of manufacture comprising: a. a thermal ink-jet cartridge; and b. the unfermented-wort-based ink formulation of any of Inventive Concepts 1-133 disposed within the thermal ink jet cartridge.

Inventive Concept 136. A method of printing comprising: Ink jetting droplets of the unfermented-wort-based ink formulation of any of Inventive Concepts 1-133 onto a foamed beverage to produce an ink-jet image on foam of the beverage.

Inventive Concept 137. The method of Inventive Concept 136 wherein the foamed beverage is a beer.

Inventive Concept 138. The method of Inventive Concept 137 wherein the beer has a carbon-dioxide-based foam.

It will be appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification, including the appendices, are hereby incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. An article of manufacture comprising:
   a. an ink-jet cartridge; and
   b. a sugar-poor and unfermented-wort-based ink formulation disposed within the ink-jet cartridge, the ink formulation comprising:
      i. an unfermented wort;
      ii. a humectant for providing moisture-retention; and
      iii. a pH controlling agent for maintaining a pH of the ink formulation at or below 4.0;
   wherein ink formulation is edible, aqueous and has all of the following structural properties:
      I. the unfermented wort is the primary colorant of the ink formulation;
      II. a 25° C. viscosity of the ink formulation is at most 4.5 centipoise;
      III. the ink formulation is characterized by an EBC (European Brewing Convention) number of at least 1800 colorant units;
      IV. a ratio between the EBC number of the ink formulation and the 25° C. viscosity thereof is at least 400 (centipoise)$^{-1}$;
      V. the ink formulation comprises at least 10% wt/wt carbohydrates;
      VI. the ink formulation is sugar-poor such that a ratio between a wt/wt % concentration of soluble sugars and a wt/wt concentration of carbohydrates in the ink formulation is at most 0.2; and
      VII. at least 60% of particles of the ink formulation are sub-400 nanometer particles.

2. The article of manufacture of claim 1 wherein the ratio between the wt/wt % concentration of soluble sugars and the wt/wt concentration of carbohydrates in the ink formulation is at most 0.1.

3. An article of manufacture comprising:
   a. an ink-jet cartridge; and
   b. a maltose-poor and unfermented-wort-based ink formulation disposed within the ink-jet cartridge, the ink formulation comprising:
      i. an unfermented wort;
      ii. a humectant for providing moisture-retention; and
      iii. a pH controlling agent for maintaining a pH of the ink formulation at or below 4.0;
   wherein ink formulation is edible, aqueous and has all of the following structural properties:
      I. the unfermented wort is the primary colorant of the ink formulation;
      II. a 25° C. viscosity of the ink formulation is at most 4.5 centipoise;
      III. the ink formulation is characterized by an EBC (European Brewing Convention) number of at least 1800 colorant units;
      IV. a ratio between the EBC number of the ink formulation and the 25° C. viscosity thereof is at least 400 (centipoise)$^{-1}$;
      V. the ink formulation comprises at least 10% wt/wt carbohydrates;
      VI. the ink formulation is maltose-poor such that a ratio between a wt/wt % concentration of maltose and a wt/wt concentration of carbohydrates in the ink formulation is at most 0.2; and
      VII. at least 60% of particles of the ink formulation are sub-400 nanometer particles.

4. The article of manufacture of claim 3 wherein the ratio between the wt/wt % concentration of maltose and the wt/wt concentration of carbohydrates in the ink formulation is at most 0.1.

5. The article of manufacture of claim 1 wherein the ink formulation is poor in soluble amino acid compounds such that a ratio between a wt/wt % concentration of soluble amino acid compounds in the ink formulation and a wt/wt concentration of carbohydrates in the ink formulation is at most 0.1.

6. The article of manufacture of claim 1 wherein the ink formulation comprises between 65% wt/wt and 85% wt/wt water.

7. The article of manufacture of claim 1 wherein the ink formulation is characterized by at least an EBC (European Brewing Convention) number of at least 2000 colorant units.

8. The article of manufacture of claim 1 wherein at least 80% of the ink formulation are sub-400 nanometer particles.

9. The article of manufacture of claim 1 wherein at least 90% of the particles of the ink formulation are sub-200 nanometer particles.

10. The article of manufacture of claim 1 wherein the ink-jet cartridge is a thermal ink-jet cartridge.

11. The article of manufacture of claim 1 wherein the ink formulation comprises at most 100 ppm artificial colorants.

12. The article of manufacture of claim 1 wherein the wort contributes at least 90% of the light absorbance of the ink formulation at 430 nanometers.

13. A method of printing comprising:
   a. providing the article of manufacture of claim 1; and
   b. operating the ink-jet cartridge so that droplets expelled therefrom are deposited onto a foamed beverage to produce an ink-jet image on foam of the beverage.

14. The method of claim 13 wherein the foamed beverage is a beer.

15. The method of claim 14 wherein the beer has a carbon-dioxide-based foam.

16. The article of manufacture of claim 1 wherein the ratio between the wt/wt % concentration of soluble sugars and the wt/wt concentration of carbohydrates in the ink formulation is at most 0.025.

17. The article of manufacture of claim 4 wherein the ratio between the wt/wt % concentration of maltose and the wt/wt concentration of carbohydrates in the ink formulation is at most 0.025.

18. The article of manufacture of claim 1 wherein the ink formulation comprises at most 2% w/wt soluble sugars.

19. The article of manufacture of claim 1 wherein the ink formulation comprises at most 1.5% w/wt soluble sugars.

* * * * *